Patented Jan. 19, 1932

1,841,961

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF VAT DYESTUFFS

No Drawing. Application filed June 16, 1927, Serial No. 199,420, and in Germany June 30, 1926.

It is well known that ms-benzdianthrone, when treated with aluminium chlorid, furnishes ms-naphthodianthrone of the formula

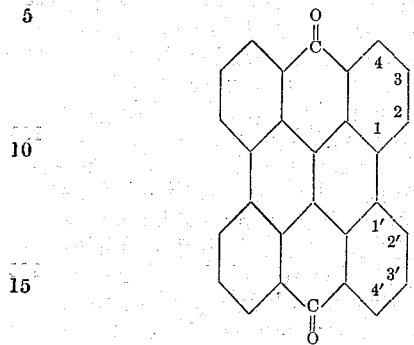

2 atoms of hydrogen being split off. 2.2'-dimethyl-ms benzdianthrone behaves in an entirely analogous manner. From the tinctorial point of view, the ms-naptho-dianthrones possess even less interest than the ms-benzdianthrones, since it is only after an addition of zinc dust that they furnish, with an alkaline hydrosulphite solution, orange to flesh-colored vat solutions, from which cotton is dyed only pale yellow shades.

We have now found that valuable new condensation products, entirely different from those already mentioned can be obtained with excellent yields by subjecting 2.2'-dimethyl-ms-benzianthrone or its derivatives to the influence of agents with an alkaline reaction, preferably alkaline condensing agents, for example calcined sodium carbonate, sodium acetate, potassium carbonate, barium oxid, caustic potash, alcoholic caustic potash, and the like, if desired in the presence of solvents or diluents. It is probable that, under these conditions, a condensation takes place with the formation of a new hexagon ring with the aid of the two methyl groups, in accordance with the following formulæ:

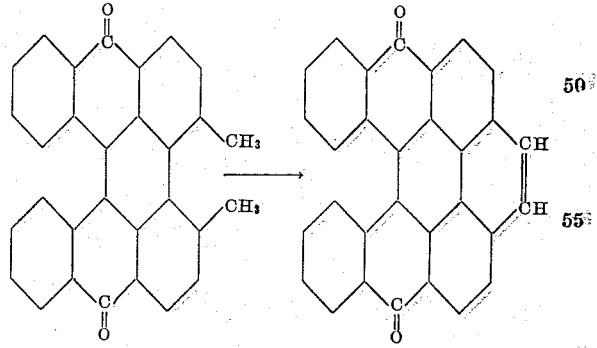

The new products, which we have termed allo-ms-naphthodianthrones, are excellent vat dyestuffs, and, in addition, form valuable initial materials for the production of other dyestuffs, by reason of their great reactivity.

New and particularly valuable vat dyestuffs can be obtained by treating the aforesaid allo-ms-naphthodianthrones with acid condensing agents, such as aluminium chlorid, and the like, with or without the presence of solvents. The same new dyestuffs are also formed by subjecting the said original dyestuffs, the allo-ms-naphthodianthrones, dissolved in concentrated sulfuric acid, to the action of light or of oxidizing agents such as lead dioxid, manganese dioxid, nitric acid, and the like. It is probable that by such treatments further condensation is effected with additional ring formation according to the formulæ:

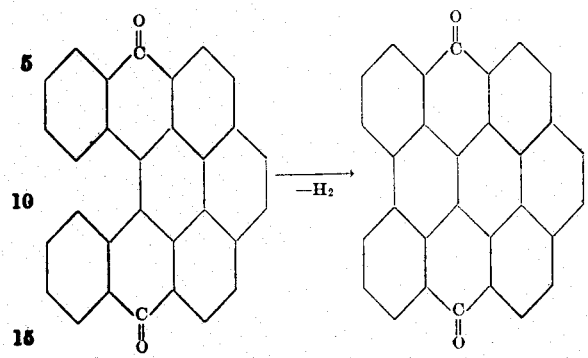

The new products may be termed ms-anthradianthrones. They generally dissolve in concentrated sulfuric acid to a violet to blue solution, and the bluish-violet vats give dyeings, on cotton, of similar shades which, when washed and soaped, change to a golden yellow extremely fast to light and chlorine.

The same ms-anthradianthrones are produced when 2.2′-dimethyl-ms-naphthodianthrone or its derivatives are treated with alkaline agents in the manner already described with reference to the 2.2′-dimethyl-ms-benzdianthrones. In this reaction probably 4 atoms of hydrogen are split off, thereby leading to the ring system of ms-anthradianthrone, as in the following formulæ:

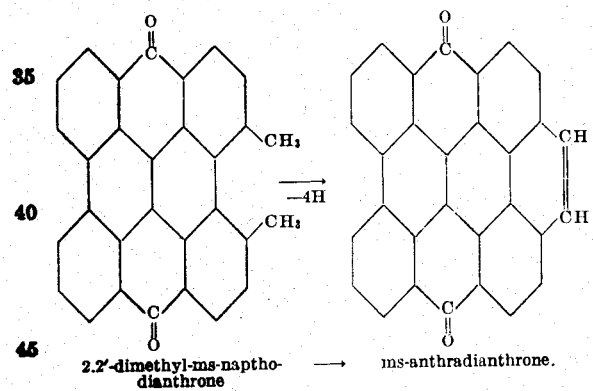

2.2′-dimethyl-ms-napthodianthrone  →  ms-anthradianthrone.

We have further found that new halogeniferous vat dyestuffs are obtained when halogen is introduced into the above-described allo-ms-naphthodianthrones and ms-anthradianthrones. The new dyestuffs are distinguished from the allo-ms-naphthodianthrones and ms-anthradianthrones which are free from halogen by their deeper color, which mostly is substantially more reddish and by their excellent affinity. Moreover, these new products are of great interest not only as vat dyestuffs, but also as intermediate products for the manufacture of other vat dyestuffs.

The introduction of halogen may be effected in various ways. For example, halogen, or agents liberating the same, may be allowed to act on the dyestuffs in the presence or absence of catalysts. Suitable catalysts for this purpose, are for example, iodine, sulfur metals and metallic salts. The reaction is preferably carried on in solvents or diluents. Other methods, however, may be adopted. For instance, in the case of the ms-anthradianthrones, the halogen-allo-ms-naphthodianthrones, obtainable by halogenating the allo-ms-naphthodianthrones under the conditions above specified, may be transformed, by treatment with acid condensing agents, or by the action of oxidizing agents or light in acid solution, into the corresponding halogen-ms-anthradianthrones. On the other hand, the allo-ms-naphthodianthrones obtainable by the action of alkaline agents on 2.2′-dimethyl-ms-benzdianthrone or its derivatives, may be subjected to treatment with halogen and simultaneous condensation, for example to treatment with halogen under pressure, whereby halogenation and condensation are effected simultaneously.

By the above mentioned methods of halogenation also halogen-ms-naphthodianthrones can be obtained from ms-naphthodianthrone or its derivatives. The same halogenated ms-naphthodianthrones are also obtainable by subjecting halogenated ms-benzdianthrones to condensation in the aforesaid manner or not halogenated ms-benzdianthrones to simultaneous condensation and halogenation. The halogenated ms-naphthodianthrones thus obtainable are of comparatively low value as vat dyestuffs, but are valuable intermediary products for the production of other vat dyestuffs.

For purification, the afore-described halogenated dyestuffs may be recrystallized from solvents of high boiling point, or may be treated, in paste form, with hypochlorite. They usually give blue to reddish-violet solutions in concentrated sulfuric acid in some cases with more or less strong fluorescence, and furnish, with an alkaline hydrosulphite solution, blue-violet vats from which dyeings of similar shades are obtained on cotton. After being washed and exposed to the air, the color changes to extremely fast orange or orange-red shades.

We have also found that the properties of the halogeniferous vat dyestuffs can be substantially improved by introducing several different halogens into the allo-ms-naphthodianthrones or ms-anthradianthrones. This is effected by treating the said anthrone derivatives with different halogens either concurrently or successively, for example with chlorine and bromine, or suitable agents which liberate halogens, and preferably in presence of solvents or diluents and in presence or absence of halogen-transferrers. The introduction of different halogens into the allo-ms-naphthodianthrones or ms-anthradianthrones may also be effected by introducing into such halogen-allo-ms-naphthodianthrones or halogen-ms-anthradianthrones which are still capable of taking up more halogen, another halogen, which differs from that already contained in the original substance, the said introduction being carried out in the manner already described. This process furnishes excellent yields. The resulting dyestuffs give brilliant scarlet to red dyeings on cotton from a blue-violet vat. For example the dichlor-dibrom-allo-ms-naphthodianthrone prepared by this process dyes cotton a considerably faster and deeper red than is obtained from tetrabrom-allo-ms-naphthodianthrone. Apart from the valuable shade, the resulting dyestuffs also display, in many cases, surprisingly improved properties as regards fastness.

The following examples will further explain the nature of the invention which however is not restricted to these examples. The parts are by weight.

*Example 1*

1 part of 2.2'-dimethyl-ms-benzdianthrone is dissolved in 12 parts of nitrobenzene, 4 parts of barium oxid being added, and the whole boiled and stirred for 4 hours, whereupon the solvent is expelled by means of steam. The residue is boiled with water, or dilute hydrochloric acid and filtered by suction. The resulting product is a brown powder which can be recrystallized from pyridine and is then obtained in the form of brownish-red needles melting at 349° to 351° C.: it dissolves to a green solution in concentrated sulfuric acid and gives violet dyeings on cotton from a vat of the same color, the color changing to orange after exposure to the air and washing.

*Example 2*

10 parts of 2.2'-dimethyl-ms-benzdianthrone are stirred at 110° to 120° C. into a melt of 50 parts of caustic potash and 55 parts of ethyl alcohol, the mixture being then heated to 170° to 175° C. for 6 hours or thereabouts. The reaction mass is treated with hot water, and the dyestuff is precipitated by means of an air blast and filtered by suction. It is identical with the product described in Example 1.

*Example 3*

1 part of 2.2'-dimethyl-ms-benzdianthrone is dissolved in 40 parts of aniline and after addition of 8 parts of powdered caustic potash, is boiled for about 4 hours. The aniline is then driven off by steam distillation and the residue is filtered by suction. The resulting dyestuff behaves in the same way as that produced in Example 1.

*Example 4*

1 part of 4.4'-dichlor-2.2'-dimethyl-ms-benzdianthrone is stirred and boiled in 20 parts of nitrobenzene and 8 parts of potassium carbonate, or calcined sodium carbonate, for 4 hours, and is then treated as in Example 1. The new dyestuff is a brown powder which dissolves to a greenish blue solution in concentrated sulfuric acid. It gives brown dyeings on cotton from a violet vat.

*Example 5*

2.2'-dimethyl-ms-benzdianthrone is introduced at 210° C. into a tenfold amount of fused caustic potash. After stirring for about two hours and dissolving the mass in water, the dyestuff is precipitated by an air blast and filtered by suction. The dyestuff is identical with that described in Example 1.

*Example 6*

1 part of the product obtainable according to Example 1 is thoroughly triturated with 20 parts of aluminium chlorid, and heated at 150° to 155° C. for 1½ hours and, after the addition of ice and dilute hydrochloric acid, is filtered by suction. The resulting dark brown powder may be purified by boiling it with dilute hypochlorite solution. It forms a light brown powder, which may be crystallized in small brown needles from nitrobenzene. The color of the solution in concentrated sulfuric acid is violet. Strong golden-yellow dyeings are obtained on cotton from a blue violet vat.

*Example 7*

1 part of the initial substance referred to in Example 6 is dissolved in 25 parts of trichlorbenzene and 10 parts of powdered aluminium chlorid are stirred in at from 140° to 145° C. After stirring for about 1½ hours, ice and dilute hydrochloric acid are added, and the solvent is expelled with steam. The resulting product is identical with the product obtained in Example 6.

*Example 8*

1 part of the condensation product obtainable from 4.4'-dichlor-2.2'-dimethyl-ms-benzdianthrone, according to Example 4, is mixed with 20 parts of aluminium chlorid and heated to from 145° to 150° C. for 1½ hours. The mass is treated as in Example 6. The resulting brown powder, dissolves to a violet solution in concentrated sulfuric acid, and gives yellow dyeings on cotton from a violet vat.

*Example 9*

1 part of manganese dioxid is stirred, at ordinary temperature into the solution of 1 part of the dyestuff described in Example 1 in 50 parts of concentrated sulfuric acid. Stirring is continued until the color of the solution has changed from green to a pure violet and after filtering by suction the filtrate is precipitated with ice. The resulting brown reaction product is identical with the dyestuff described in Example 6.

The manganese dioxid may be replaced by lead dioxid, saltpetre, lead tetra-acetate or similar oxidizing agents.

Example 10

A solution in concentrated sulfuric acid of the original substance used in Example 6 is exposed to daylight until the originally green color of the solution has become violet. The resulting dyestuff is precipitated by pouring the solution into water; it is identical with the product obtained in Example 6.

Example 11

1 part of 2.2'-dimethyl-ms-naphthodianthrone is introduced at 110° to 120° C. into a melt of 5 parts of caustic potash and 5 parts of ethyl alcohol. The temperature is raised to from 170° to 175° C. and maintained at that temperature for another 6 hours, the melt being then dissolved in water. After the resulting dyestuff has been precipitated by an air blast, it is filtered by suction; the brown reaction product may be purified by treatment with hypochlorite solution. The dyestuff dissolves in concentrated sulfuric acid to a violet solution, and gives golden-yellow dyeings, fast to light and chlorine, on cotton from a blue-violet vat. It is probably identical with the product described in Example 6.

Example 12

1 part of 2.2'-dimethyl-ms-naphthodianthrone is introduced at 210° C. into a melt of 10 parts of caustic potash, and after being kept at from 220° C. to 230° C. for a further two hours, the mass is treated as in Example 11. The resulting dyestuff is identical with that obtainable according to that example.

Example 13

1 part of 4.4'-dichlor-2.2'-dimethyl-ms-naphthodianthrone is stirred and boiled in 10 parts of nitrobenzene, with addition of 10 parts of potassium carbonate, for about 4 hours, then filtered by suction after cooling, the resulting dyestuff being freed from the potassium carbonate by boiling with water. The product is a brownish-yellow powder, which dissolves to a violet solution in concentrated sulfuric acid and gives orange-yellow dyeings on cotton from a brown-violet vat.

Example 14

2.2'-dimethyl-ms-naphthodianthrone is stirred and boiled in 10 parts of nitrobenzene, with addition of 4 parts of barium oxid, for about 4 hours. After filtration by suction, the resulting dyestuff is freed from admixed barium oxid by boiling with dilute hydrochloric acid; it is identical with the product obtained in Example 11.

Example 15

1 part of the vat dyestuff obtainable according to Example 1 is dissolved in 10 to 12 parts of nitrobenzene, whereupon 0.1 part of iodine is added and 1½ parts of sulfuryl chlorid are stirred in, drop by drop, at 60° C. Stirring is continued for a further 6 hours whereupon the mass is allowed to cool and the dichlor-allo-ms-naphthodianthrone separated in crystalline form is filtered off by suction. It dissolves to a green solution in concentrated sulfuric acid, and can be recovered, therefrom, as an orange paste, by precipitation with water. It gives orange dyeings on cotton from a violet vat.

Example 16

A current of dry chlorine is passed for an hour through a boiling solution of the product described in Example 1 in 10 parts of trichlorbenzene to which 0.1 part of iodine has been added. The solvent is then expelled with steam, and the residue is preferably dissolved in concentrated sulfuric acid and precipitated therefrom by dilution. The resulting product has the same properties as that obtained in Example 15.

Example 17

1 part of the product described in Example 1 is dissolved in 10 parts of nitrobenzene, whereupon 1 part of bromine is added and the mixture gradually heated, while stirring, to 150° C. After stirring for 4 hours at this temperature, the mixture is allowed to cool, and the deposited brownish-red crystals are filtered by suction. The resulting dyestuff which is a dibrom-allo-ms-naphthodianthrone may be recrystallized from nitrobenzene and then forms brick-red needles, which dissolve to an emerald green solution in concentrated sulfuric acid. Very strong and clear scarlet dyeings are obtained on cotton from a violet vat.

Example 18

1 part of the product obtainable according to Example 4 is dissolved in 10 to 12 parts of nitrobenzene, 3 parts of bromine being then stirred in, drop by drop, at 160° C., this temperature being maintained for 4 hours and the dyestuff filtered by suction when cold. It gives violet red dyeings on cotton from a violet vat.

Example 19

1 part of the original substance used in Example 17 is dissolved in 10 parts of nitrobenzene, 0.05 part of iron filings being then added. The temperature is raised to 160° C. and 2 parts of bromine are added by drops. After stirring for 4 hours at the same temperature, the mixture is treated as in Example 17. The resulting dyestuff which is a tetrabrom-allo-ms-naphthodianthrone gives brilliant red dyeings on cotton from a violet vat.

Example 20

10 parts of ms-anthradianthrone (the dyestuff of Example 6) are suspended in 200 parts of trichlorbenzene, 0.5 part of iodine being added, and chlorine passed in at 150° C. until the reaction product acquires an orange-red color, which will occur in about an hour. After cooling, the orange-red precipitate is filtered by suction. The resulting chlor-ms-anthradianthrone dissolves to a violet solution in concentrated sulfuric acid. The vat solution is bluish-violet and the resulting dyeings are orange.

Example 21

10 parts of ms-anthradianthrone are dissolved in 250 to 300 parts of nitrobenzene, and after addition of 0.5 part of iron filings or powder are treated with about 15 parts of bromine, stirred in at 160° C. Stirring is continued for about 4 hours at the same temperature, and the dyestuff is filtered by suction after cooling. According to analysis, it is a dibromine derivative. It gives a violet solution in concentrated sulfuric acid, and a bluish-violet vat which furnishes orange dyeings on cotton.

Example 22

A suspension of 1 part of ms-anthradianthrone in 20 parts of phosphorus oxychloride is boiled for 1½ to 2 hours with 10 parts of phosphorus pentachloride, after which the reaction product is decomposed with water and filtered off by suction. The resulting brown monochlor-ms-anthradianthrone may be purified with hypochlorite; it gives extremely fast orange dyeings on cotton from a bluish-violet vat.

Example 23

A mixture of 1 part of the dyestuff described in Example 17 (dibrom-allo-ms-naphthodianthrone) and 10 parts of aluminium chlorid is heated to from 160° to 165° C. until the color of the solution of a sample of the reaction product in concentrated sulfuric acid has become blue, which will occur in about 1½ to 2 hours. Dilute hydrochloric acid is then added, and the dyestuff is filtered by suction. According to analysis, the resulting brown powder is a dibrome-ms-anthradianthrone; it can be purified by treatment with hypochlorite or by crystallization from nitrobenzene. It furnishes strong orange-red dyeings on cotton from a bluish-violet vat.

Example 24

1 part of the dyestuff described in Example 1 (allo-ms-naphthodianthrone) is heated with 3 parts of bromine to 100° C. for about 12 hours under pressure. The reaction product is dissolved in dilute caustic soda solution and filtered by suction. It consists of a brown powder, which dissolves to a greenish-blue solution in concentrated sulfuric acid, and gives strong orange-red dyeings on cotton from a bluish-violet vat.

Example 25

10 parts of the dyestuff obtainable according to Example 1 are dissolved in 100 parts of chlorsulfonic acid, whereupon 3 parts of sulfur are added while stirring, followed by 4 parts of bromine. The mass is then heated to 65° to 70° C. and stirred at this temperature for 4 hours, whereupon it is diluted with 50 parts of concentrated sulfuric acid and poured onto ice. The resulting dibrom-ms-anthradianthrone is filtered off by suction. It dissolves with a blue coloration in concentrated sulfuric acid and dyes cotton from a bluish-violet vat orange shades of excellent fastness.

Example 26

10 parts of chlor-allo-ms-naphthodianthrone (the dyestuff of Example 15) are dissolved in 100 parts of nitrobenzene and after addition of 1 part of iron filings are stirred with 10 parts of bromine at 160° C., the stirring being continued at the same temperature until the evolution of hydrogen bromide ceases in about 6 to 8 hours. The dyestuff, which is filtered after cooling, and according to analysis is a dichlor-dibrom derivative, forms a brown-red powder which dissolves to a green solution in concentrated sulfuric acid. Brilliant red dyeings are obtained from a bluish-violet vat.

Example 27

10 parts of sulfuryl chlorid are stirred, drop by drop, at about 60° C. into a solution of 10 parts of allo-ms-napthodianthrone (obtainable in accordance with Example 1) in 100 parts of nitrobenzene, 0.5 part of iodine having been previously added. Stirring is continued, at the same temperature, for further 6 hours, after which the temperature is raised to 160° C. and 0.5 part of iron filings or powder is added, followed by 10 parts of bromine. As soon as the evolution of halogen hydride has ceased, the treatment is continued as in Example 25, and the reaction product behaves in the same manner as that obtained in the said example.

Example 28

10 parts of ms-naphthodianthrone are suspended in 200 parts of trichlorbenzene, and chlorine is passed in for 2 hours at a temperature of 100° C. after addition of 0.5 part of sodium. The mixture is allowed to cool and the reaction product is filtered by suction. After recrystallization from nitrobenzene pale yellow needles are obtained, which dissolve in concentrated sulfuric acid to a red solution having about the color of fuchsine and showing a strong fluorescence.

*Example 29*

10 parts of 2.2'-dimethyl-ms-naphthodianthrone are suspended in 200 parts of nitrobenzene; after addition of 0.5 part of iron filings, 30 parts of bromine are stirred in at a temperature of 160° C. Stirring is continued for 6 hours at the said temperature whereupon the mixture is allowed to cool and the reaction product filtered by suction. Dibrom-2.2'-dimethyl-ms-naphthodianthrone is obtained in yellow needles which dissolves in concentrated sulfuric acid to a red solution having about the color of fuchsine and showing strong fluorescence.

*Example 30*

A mixture of 20 parts of tribrom-ms-benzdianthrone and 200 parts of aluminium chlorid is heated to 160° to 165° C. until a sample of the reaction mixture dissolves in concentrated sulfuric acid to a red solution having about the color of fuchsine. This will be the case in about 1½ to 2 hours. The reaction mixture is then decomposed with dilute hydrochloric acid and the tribrom-ms-naphthodianthrone formed is filtered by suction. When recrystallized from nitrobenzene it forms pale yellow needles.

*Example 31*

10 parts of trichlor-ms-benzdianthrone are dissolved in 600 parts of concentrated sulfuric acid and manganese dioxid is added until the initially blue solution has turned to a red having about the color of fuchsine. The reaction mixture is poured onto ice and the trichlor-ms-naphthodianthrone formed is filtered by suction.

What we claim is:

1. As new articles of manufacture, vat dyestuffs which are considered to contain the system

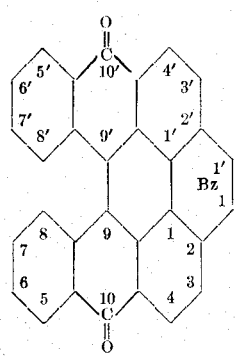

in which dyestuffs two anthrone radicals are so linked together as to form two more hexagon rings.

2. As new articles of manufacture, vat dyestuffs which are considered to be allo-ms-naphthodianthrones, which form violet vats and give green to greenish-blue solutions in concentrated sulfuric acid.

3. The process of producing new vat dyestuffs which consists in subjecting dyestuffs corresponding to the general formula

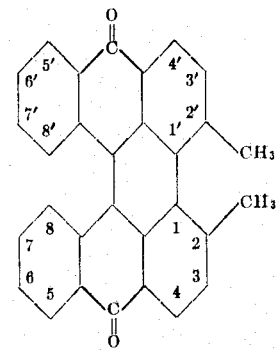

in which two anthrone radicals are linked by one hexagon ring to the action of alkaline agents.

4. The process of producing new vat dyestuffs which consists in subjecting a 2.2'-dimethyl-ms-benzdianthrone to the action of alkaline agents.

5. The process of producing new vat dyestuffs which consists in subjecting a 2.2'-dimethyl-ms-benzdianthrone to the action of an alkaline condensing agent.

6. The process of producing new vat dyestuffs which consists in subjecting a 2.2'-dimethyl-ms-benzdianthrone to the action of an alkaline condensing agent in an inert organic diluting medium.

7. As new articles of manufacture, vat dyestuffs which are considered to contain the system

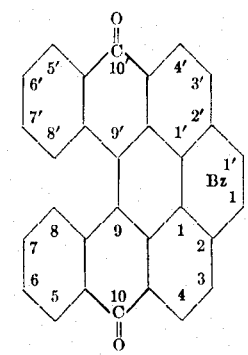

in which dyestuffs two anthrone radicals are so linked together as to form from 2 to 3 more hexagon rings, two of which are indicated in the formula, and of which the third may be formed by a linking between the 8— and 8'— positions of the anthrone radicals.

In testimony whereof we have hereunto set our hands.

MAX ALBERT KUNZ.
KARL KÖBERLE.